United States Patent [19]

Walter et al.

[11] Patent Number: 4,482,338
[45] Date of Patent: Nov. 13, 1984

[54] TORQUE TRANSMITTING BEARING ASSEMBLY FOR MEMBERS ADAPTED FOR A RELATIVE LONGITUDINAL MOVEMENT AND METHOD OF ASSEMBLY THEREOF

[75] Inventors: Lothar Walter, Schweinfurt; Manfred Brandentein, Eussenheim; Horst M. Ernst, Eltingshausen; Armin Olschewski, Schweinfurt, all of Fed. Rep. of Germany

[73] Assignee: SKF Kugellagerfabriken GmbH, Schweinfurt, Fed. Rep. of Germany

[21] Appl. No.: 408,488

[22] Filed: Aug. 16, 1982

[30] Foreign Application Priority Data

Aug. 17, 1981 [DE] Fed. Rep. of Germany ... 8124025[U]

[51] Int. Cl.³ .............................................. F16C 29/04
[52] U.S. Cl. .................................... 464/167; 464/178
[58] Field of Search ....................... 464/81, 82, 83, 85, 464/89, 91, 139, 141, 162, 166, 167, 150, 152, 170, 178

[56] References Cited

U.S. PATENT DOCUMENTS

| | | | |
|---|---|---|---|
| 1,498,171 | 6/1924 | Kaps | 464/141 |
| 1,685,859 | 10/1928 | Noel | 464/141 |
| 2,038,466 | 4/1936 | Yates | 464/141 |
| 2,341,947 | 2/1944 | Roberts | 464/167 X |
| 2,397,538 | 4/1946 | Davis | 464/81 |
| 2,902,844 | 9/1959 | Rzeppa | 464/82 X |
| 3,663,046 | 5/1972 | Reiner et al. | 464/167 X |
| 4,201,424 | 5/1980 | Ernst et al. | 464/167 X |
| 4,368,050 | 1/1983 | Peterson | 464/83 |

FOREIGN PATENT DOCUMENTS

| | | | |
|---|---|---|---|
| 1046543 | 12/1958 | Fed. Rep. of Germany | 464/166 |
| 2849758 | 6/1980 | Fed. Rep. of Germany | |
| 7401483 | 8/1975 | Netherlands | 464/167 |
| 543683 | 12/1973 | Switzerland | |

Primary Examiner—Stuart S. Levy
Assistant Examiner—Daniel P. Stodola
Attorney, Agent, or Firm—Eugene E. Renz, Jr.

[57] ABSTRACT

A torque transmitting assembly consisting of a shaft mounted in the housing and a plurality of rolling elements arranged in rows in the annular space between the shaft and the housing. The shaft has a series of axially extending grooves defining elongated inner raceways for the rolling elements. The assembly further includes a bearing race plate for each of the rows of rolling elements having an elongated raceway groove formed therein defining the outer raceway for the rolling elements. Each of the race plates has a layer of a plastically deformable material on the outer surface opposite the raceway and a series of screws mounted in the housing having a cupped point engageable with the deformable material to fix each of the bearing race plates in an axial and peripheral direction to thereby facilitate torque transmission from the shaft to the housing in either direction of rotation of the shaft.

2 Claims, 4 Drawing Figures

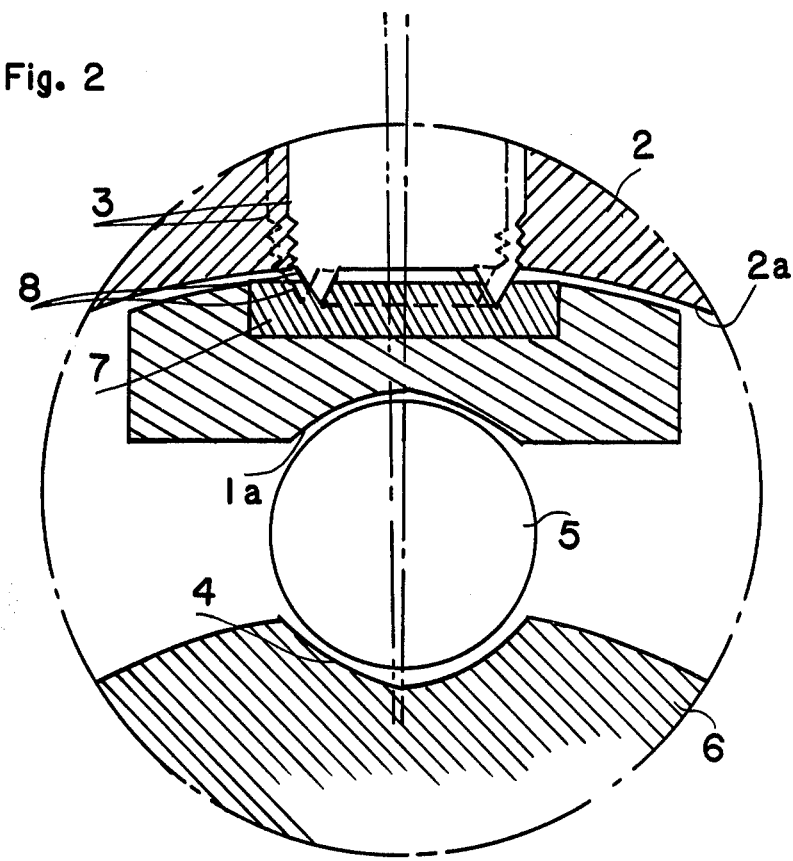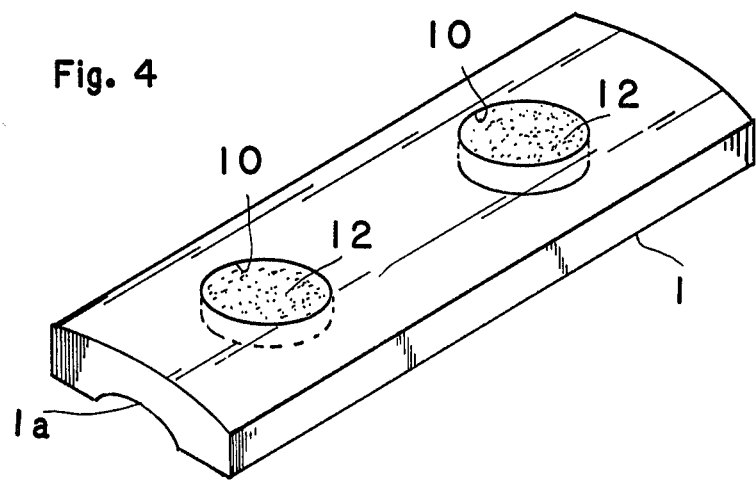

TORQUE TRANSMITTING BEARING ASSEMBLY FOR MEMBERS ADAPTED FOR A RELATIVE LONGITUDINAL MOVEMENT AND METHOD OF ASSEMBLY THEREOF

BACKGROUND AND SUMMARY OF THE INVENTION

The present invention relates broadly to torque transmitting bearing assemblies particularly adapted to applications for members mounted for relative longitudinal movement.

More specifically, the present invention relates to a bearing application in an assembly wherein a shaft is axially slidable by means of a roller bearing in a housing, the roller bearing provided with at least one bearing race plate which is radially adjustable by means of a housing screw and is adjustably arranged by means of a corresponding row of balls against the bearing race groove running axially in the shaft. The present invention provides means for automatically aligning the bearing race plate in order to prevent a negative effect on the properties resulting from finishing tolerance inaccuracies produced during installation. Specifically, the invention comprises a cupped point arranged on the outer terminal end of the housing screw which penetrates a plastically deformable insert of the bearing race plate during the adjustment of the bearing race plate to achieve automatic alignment thereof.

Bearing arrangements of this type are not new per se. For example, in German Preliminary Application No. 2,849,758, a convex conical or truncated conical surface is machined in the radially slidable bearing race plate and a corresponding but concave constructed conical or truncated conical surface is formed on the outer terminal end of the housing screw. In this manner, the bearing race plate may be adjusted through the housing screw and the bearing race plate is fixed axially and in a peripheral direction by means of the coacting conical surfaces. Thus, the bearing arrangement is capable of transmitting torque. It has been found, however, that the conical surfaces produce a predetermined form-fit contact so that with finishing tolerances, a tilting or offsetting of the bearing race plate must be anticipated especially when the housing screw is not aligned with the center line of the bearing race plate or with the bearing race groove in the shaft. By reason of this, it has been observed that there is undesirable play or poor running properties resulting from these defects so that these assemblies fail prematurely. A specific disadvantage results in applications where two bearing race plates are used for the transmission of torque. For example, in order to obtain a uniform distribution of the torque to both bearing race plates, the individual components or parts must be produced and installed without tolerance leeways. This is hardly possible and in practice is not feasible.

In accordance with another known prior art spindle arrangement shown in Swiss Patent No. 543,683, a roller bearing for the rotating shaft is fixed in the housing by means of a tension screw. In order to equalize axial play, a soft elastic material is introduced in a groove in the outer ring in which the centrally arranged portion of the tension screw presses. The spindle, however, is not intended for the transmission of torque and this patent does not concern itself with a bearing application for longitudinal movements.

With the foregoing in mind, it is therefore an object of the present invention to provide a bearing application for longitudinal movements wherein the individual parts of the assembly are formed with normal dimensional tolerance leeways contributing to economical production thereof and which is capable of being adjusted without causing a tilting or offsetting of the torque transmitting bearing race plates. Additionally, in application where two or more torque transmitting race plates are employed, a uniform load distribution can be obtained very simply and effectively. This is achieved by providing a layer of a plastically deformable material on the side of the bearing race plate confronting the terminal end of the housing screw and utilizing a screw with an axially acting cupped point as a housing screw.

By this arrangement, when adjusting the bearing race plate by means of the housing screw, a light contact takes place initially between the cupped point and the plastically deformable material of the race plate. As a result, the bearing race plate is moved smoothly against the row of balls and therefore against the bearing race groove of the shaft. During the initial contact between the shaft, row of balls, and bearing race plate, the bearing race plate is axially aligned relative to the bearing race groove and in a peripheral direction. This then is the optimum position of the bearing race plate. Upon further turning of the housing screw radially inwardly, this optimum position is retained and the cupped point of the housing screw penetrates the plastically deformable material on the surface of the bearing race plate so that the plate is fixed in all directions and now is capable of transmitting a torque. The plastic deformable material may, for example, be a metal, such as tin, aluminum, copper or the like or may be a plastic material. It is also within the scope of the invention that the appropriate side of the bearing race plate is constructed of a softer material. In applications utilizing two bearing race plates, adjustment of a second bearing race plate takes place similarly so as to produce an automatic alignment to the corresponding race groove in the shaft. A uniform distribution of the torque to both bearing race plates is therefore advantageously guaranteed in both rotational directions. Finishing tolerances of the individual parts are not a criteria and do not adversely effect the alignments since the contact surface, that is, the adjusting surface and the bearing race plate is not predetermined and is advantageously used only after the automatic, individual alignment of the race plate as a result of penetration of the cupped point of the housing screw therein.

In accordance with another embodiment of the present invention, the bearing race plate has adjacent the housing screw, a cup-shaped recess filled with a plastic deformable material. Consequently, the plastically deformable material can be easily applied that is by insertion or a pouring operation. The sidewalls of the cup-shaped recess may comprise for example, a shallow bore to confine the plastically deformable material so that a reliable torque transmission results.

DESCRIPTION OF THE DRAWINGS

These and other objects of the present invention and various features and details of the operation and construction thereof are hereinafter more fully set forth wherein:

FIG. 2 is an enlarged fragmentary sectional view of the encircled portion of FIG. 1;

FIG. 4 is a perspective view of a modified race plate showing pockets for the resilient insert.

DESCRIPTION OF THE PREFERRED EMBODIMENTS

Figure 1:
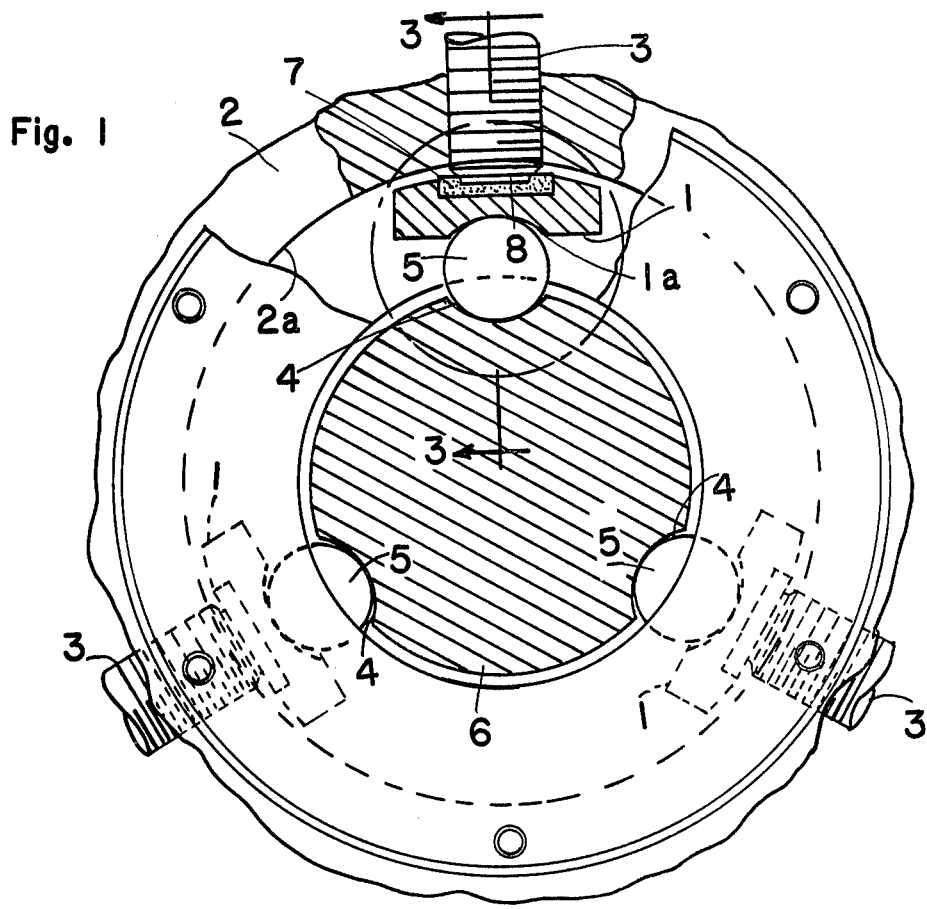
FIG. 1 is a front elevational view of a torque transmitting bearing assembly in accordance with the present invention with parts broken away and in section.
Figure 3:
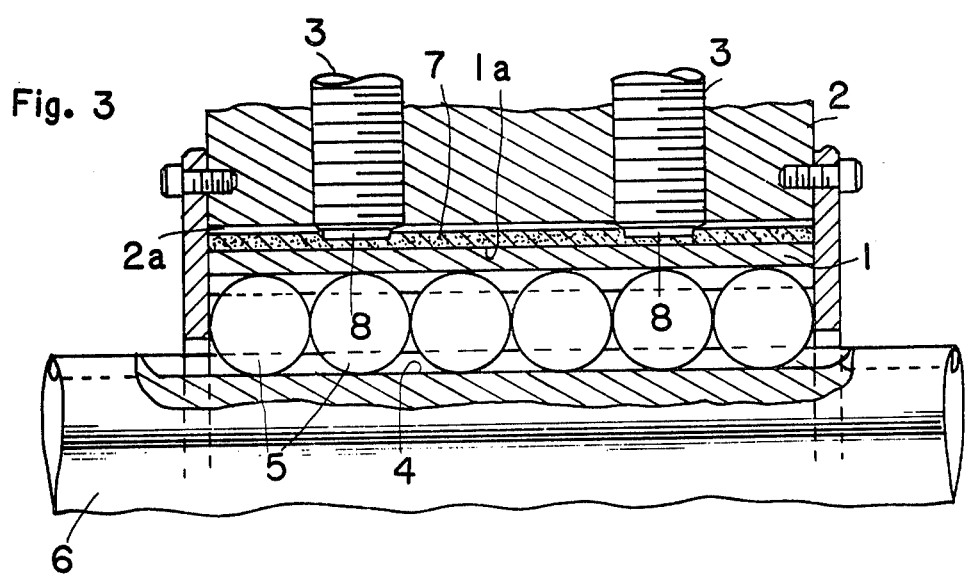
FIG. 3 is a fragmentary side elevational view taken on lines 3—3 of FIG. 1.

Referring now to the drawings and particularly to FIG. 1 thereof, there is illustrated a torque transmitting assembly in accordance with the present invention. The assembly includes a shaft 6 mounted in the bore 2a of a housing, at least one bearing race plate 1 and a plurality of rolling elements, balls 5, engaging between confronting raceway surfaces 1a and 4 of the race plate 1 and shaft 6 respectively. The bearing race plate 1 is mounted for radial sliding movement by means of a housing screw 3 and can therefore be adjusted by means of the row of balls 5 against the axially running race groove 4 of the shaft 6. The shaft 6 therefore is capable of transmitting a torque to the housing 2 by reason of the bearing race groove 4, row of balls 5, bearing race plate 1 and housing screw 3 arrangement whereby a gear, for example, mounted on the housing can be used as a driving element and in addition can engage with other drives simply by axially displacing the housing relative to the shaft. In the embodiment illustrated several bearing race plates distributed about the periphery of the ball bearing for longitudinal movements are utilized and accordingly the shaft 6 has a series of longitudinal or axial extending circumferentially spaced race grooves 4 corresponding to the number of bearing race plates. As a result of production determined tolerances in the dimensions of the various individual parts and of variations in installing the ball bearings in the housing 2, the housing screw 3 may be disposed offset so that its axis does not run through the center point of the row of balls 5 (dot-dash portion of screw in FIG. 2). Nevertheless, it is possible to adjust the bearing race plates accurately and to this end a plastically deformable insert 7, for example, of aluminum, copper, plastic or the like, is provided in the raceway plate surface confronting the housing screw 3. The housing screw 3 has a cupped point 8 on its outer terminal end, and accordingly, when the screw is turned in the direction to advance it into the deformable insert 7, the cupped point 8 first touches the plastically deformable insert and this automatically aligns the bearing race plate through the balls 5 and race groove 4 of the shaft 6. In this optimum position, namely when all of the balls of the row of balls 5 uniformly touch and engage the bearing race 4 of the shaft as well as the raceway 1a in the bearing race plate, the bearing race plate may be fixed by turning the housing screw further toward the bearing race plate. During this process, the cupped point 8 penetrates into the plastically deformable material so that the bearing race plate is also fixed in a peripheral direction and is thus capable of transmitting torque in both directions. If for example, too high an adjustment force is realized, the force can be brought to the desired degree by simple turning adjustment of the screw 3 in the housing. In this backing off process, the ideal position of the bearing race plate is left unchanged. Even though only one adjusting screw is necessary, it is possible to provide two or more longitudinally spaced screws 3 in the housing which engage the bearing race plate at axially spaced locations.

There is illustrated in FIG. 4, a modification of the present invention. In this instance the bearing race plate 1 is provided with a cup shaped recess 10 filled with a plastic deformable material 12 which can be easily applied by inserting a preformed plug or pouring. As illustrated, the sidewalls of the recess may comprise a shallow bore to confine the deformable insert material 12 so that upon engagement by the cupped point of the housing screws, a reliable torque transmission results.

Even though a particular embodiment of the invention has been illustrated and described herein, it is not intended to limit the invention and changes and modifications may be made therein within the scope of the following claims. For example, even though the bearing illustrated is a ball bearing, the principal of the present invention applies to other bearing assemblies providing relative longitudinal movement of a shaft and housing, for example, rollers.

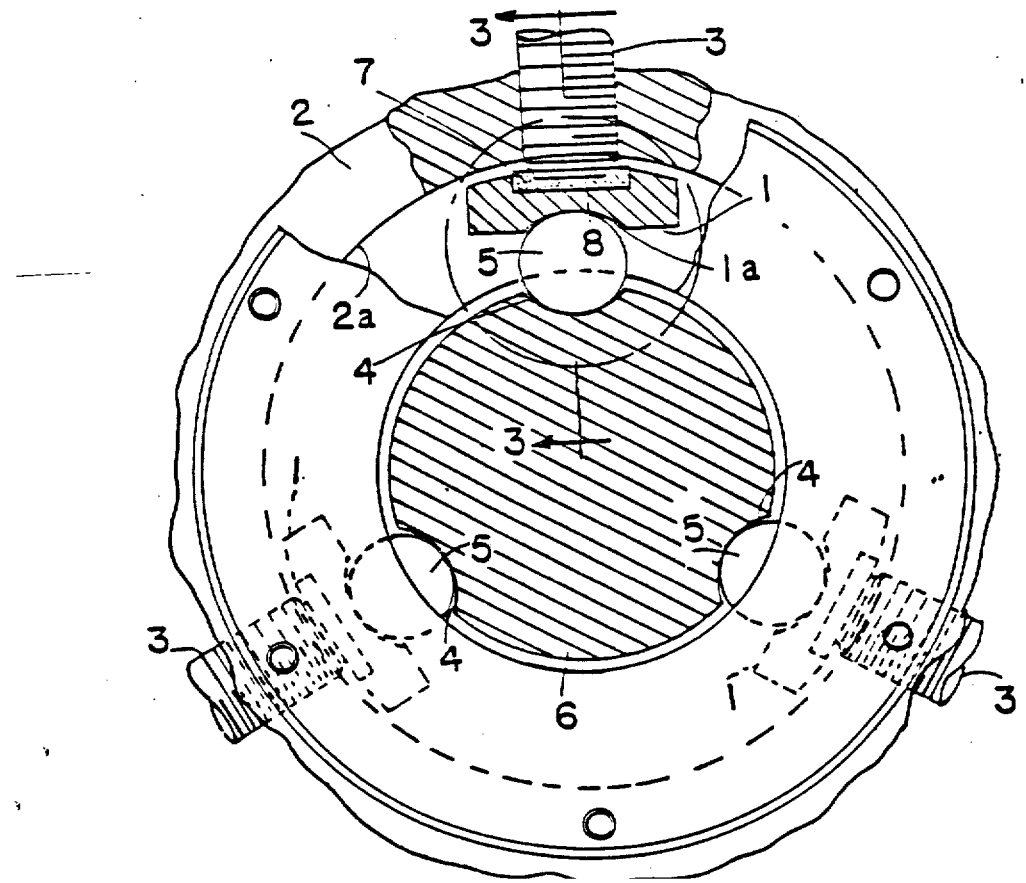

What is claimed is:

1. In a torque transmitting assembly comprising a housing, an axially slidable shaft mounted for relative longitudinal movement in said housing, an annular space between said shaft and said housing, a plurality of rows of rolling elements in said annular space, said shaft having axially extending grooves defining elongated inner raceways in which are seated the rolling elements, a bearing race plate having an elongated raceway groove mounted between each row of rolling elements and said housing, means for radially adjusting the bearing race plate to align the raceways and fixing it in an axial and peripheral direction relative to said housing to achieve torque transmission between said shaft and said housing, said means comprising a housing screw adjustable radially in said housing and having a terminal end portion confronting and engageable with a layer of plastically deformable material on the bearing race plate confronting said housing screw, said deformable material conforming to the terminal end of said screw which has a cupped point.

2. In a torque transmitting assembly as claimed in claim 1 wherein said bearing race plate has a cup-shaped recess filled with the plastically deformable material and wherein said housing screw engages in said cup-shaped recess.

* * * * *

UNITED STATES PATENT AND TRADEMARK OFFICE
CERTIFICATE OF CORRECTION

PATENT NO.  : 4,482,338

DATED       : November 13, 1984

INVENTOR(S) : Lothar Walter et al

It is certified that error appears in the above-identified patent and that said Letters Patent is hereby corrected as shown below:

On the title page Item (75), the second inventor name should read:

-- Manfred Brandenstein --.

The title page should appear as shown on the attached sheet.

Signed and Sealed this

Ninth Day of April 1985

[SEAL]

Attest:

DONALD J. QUIGG

Attesting Officer

Acting Commissioner of Patents and Trademarks

United States Patent [19]

Walter et al.

[11] Patent Number: 4,482,338
[45] Date of Patent: Nov. 13, 1984

[54] TORQUE TRANSMITTING BEARING ASSEMBLY FOR MEMBERS ADAPTED FOR A RELATIVE LONGITUDINAL MOVEMENT AND METHOD OF ASSEMBLY THEREOF

[75] Inventors: Lothar Walter, Schweinfurt; Manfred Brandenstein, Eussenheim; Horst M. Ernst, Eltingshausen; Armin Olschewski, Schweinfurt, all of Fed. Rep. of Germany

[73] Assignee: SKF Kugellagerfabriken GmbH, Schweinfurt, Fed. Rep. of Germany

[21] Appl. No.: 408,488

[22] Filed: Aug. 16, 1982

[30] Foreign Application Priority Data

Aug. 17, 1981 [DE] Fed. Rep. of Germany ... 8124025[U]

[51] Int. Cl.³ ............................................. F16C 29/04
[52] U.S. Cl. ................................... 464/167; 464/178
[58] Field of Search .................... 464/81, 82, 83, 85, 464/89, 91, 139, 141, 162, 166, 167, 150, 152, 170, 178

[56] References Cited

U.S. PATENT DOCUMENTS

| | | | |
|---|---|---|---|
| 1,498,171 | 6/1924 | Kaps | 464/141 |
| 1,685,859 | 10/1928 | Noel | 464/141 |
| 2,038,466 | 4/1936 | Yates | 464/141 |
| 2,341,947 | 2/1944 | Roberts | 464/167 X |
| 2,397,538 | 4/1946 | Davis | 464/81 |
| 2,902,844 | 9/1959 | Rzeppa | 464/82 X |
| 3,663,046 | 5/1972 | Reiner et al. | 464/167 X |
| 4,201,424 | 5/1980 | Ernst et al. | 464/167 X |
| 4,368,050 | 1/1983 | Peterson | 464/83 |

FOREIGN PATENT DOCUMENTS

| | | | |
|---|---|---|---|
| 1046543 | 12/1958 | Fed. Rep. of Germany | 464/166 |
| 2849758 | 6/1980 | Fed. Rep. of Germany | |
| 7401483 | 8/1975 | Netherlands | 464/167 |
| 543683 | 12/1973 | Switzerland | |

Primary Examiner—Stuart S. Levy
Assistant Examiner—Daniel P. Stodola
Attorney, Agent, or Firm—Eugene E. Renz, Jr.

[57] ABSTRACT

A torque transmitting assembly consisting of a shaft mounted in the housing and a plurality of rolling elements arranged in rows in the annular space between the shaft and the housing. The shaft has a series of axially extending grooves defining elongated inner raceways for the rolling elements. The assembly further includes a bearing race plate for each of the rows of rolling elements having an elongated raceway groove formed therein defining the outer raceway for the rolling elements. Each of the race plates has a layer of a plastically deformable material on the outer surface opposite the raceway and a series of screws mounted in the housing having a cupped point engageable with the deformable material to fix each of the bearing race plates in an axial and peripheral direction to thereby facilitate torque transmission from the shaft to the housing in either direction of rotation of the shaft.

2 Claims, 4 Drawing Figures